UNITED STATES PATENT OFFICE.

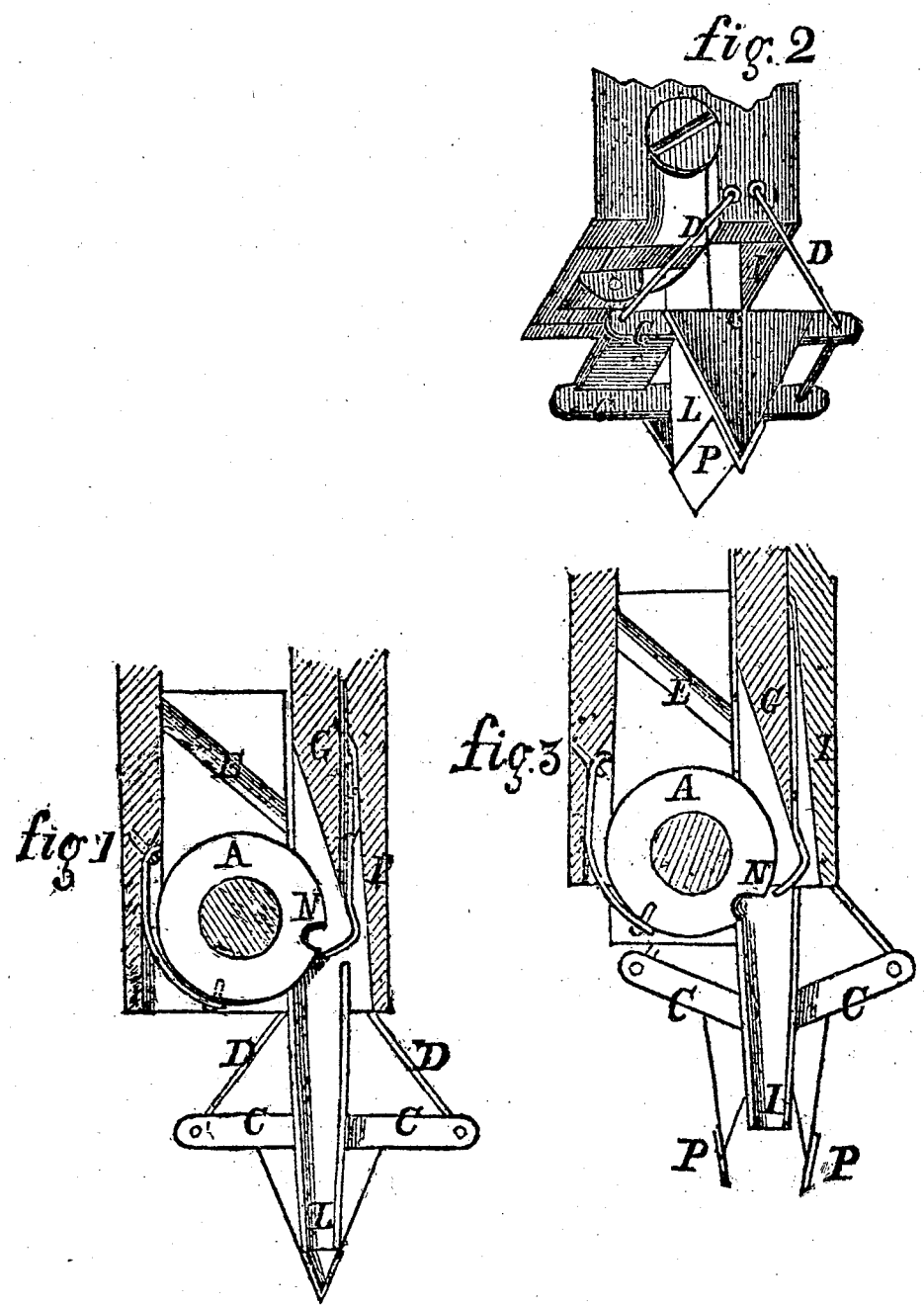

FRANCIS G. WYNKOOP, OF CORNING, NEW YORK, ASSIGNOR TO HENRY L. EDSON, OF SAME PLACE.

IMPROVEMENT IN SEED-PLANTERS.

Specification forming part of Letters Patent No. 13,694, dated October 16, 1855.

*To all whom it may concern:*

Be it known that I, FRANCIS G. WYNKOOP, of Corning, Steuben county, State of New York, have invented certain new and useful Improvements in Corn and Seed Planters; and I do hereby declare that the following is a full and exact description thereof, reference being had to the accompanying drawings, making a part of this specification, and to letters of reference marked thereon.

The nature of my invention consists in providing the tube of a seed-planter with spades of a novel construction to serve as valves for the same, and which at the same time may be used for the purpose of perforating or spading and cutting the soil where the seed is to fall, and thereby facilitate the covering of the same.

To enable others skilled in the arts to make and use my invention, I will proceed to describe its construction and mode of operation.

Figure 1 is a vertical lodgitudinal section, showing the interior of the seed-box K and the throat or passage F, formed by the inclined bottom of the seed-box E, through which the seed passes to the chamber N in the cylinder A, which is here represented in position to receive the quantity of seed required for each hill planted. S is a spring fastened to the slide G, with its outer end curved, so as to rest on the surface of the cylinder A; L, the tube leading from the cylinder A to the spades. C C represent the spades closed, and D D the rods which connect the spades with the frame of the machine, for the purposes hereinafter described. I is a part of the frame of the machine extending beyond the top of the seed-box, so as to receive the handle M, and J the lid or cover of the seed-box. S is a spring, with one end attached to the frame H and the other to the cylinder A, for the purpose described in the operation.

Fig. 2 is also a vertical longitudinal section, showing the position of the different parts of the machine when discharging the seed.

Fig. 3 is a horizontal longitudinal section, showing the top of slide G, which is connected with F, B, and A by the top spring, S, fastened to H. F F are grooved pieces, which support the inclined bottom E.

Fig. 4 is a vertical cross-section, showing the spring S-S', cylinder A, and bearings B B as seen from the front.

Fig. 5 is a perspective view of the machine; and Fig. 6 is a view of the spades detached from the machine and separate, showing clearly their form and construction, P P being the blades of the spades, which close over the mouth of the tube L, as seen in Fig. 5, and open for the spreading of the soil and passage of the seed, as shown at L, Fig. 2.

The different sections of my corn and seed planters are so fully represented in the drawings accompanying this specification and forming a part of the same, so clearly showing the form, construction, arrangements, and combination of every part of it, that I deem any further description unnecessary, and therefore proceed to describe its operation.

Fig. 5 represents the machine ready for use. The seed is put into the box K at the opening covered by the lid J, which, closed, secures the seed in the box, the operator taking the machine by the handle M. Force the spades C C into the ground till the bars of the spades rest upon it. Then force down the slide G by means of the handle O, which causes the cylinder A to turn by means of the spring S, attached to the frame H, and discharge the seed contained in N into the tube L, while the spring S', attached to the slide G, prevents any seed from escaping; but that contained in N also causes the spades to open by means of the rods D D, which pass through the bars of the spades and fasten them permanently to the frame of the machine, their centers being attached to the slides G, causing them to open from the mouth of the tube L and allow the seed to pass into the ground, as shown in Fig. 11. The spades are then drawn out of the ground while open, which causes the soil to fall over the tops of the blades P P of the spades C C through the opening in their sides, as shown at Fig. 11, completely covering the seed. The operator then draws back the slide G, which again adjusts the machine for further operation.

What I claim as my invention, and desire to secure by Letters Patent, is—

The construction and arrangement of the spades C C with the tube L, when attached to and operated upon by the slide G, for the purposes herein above described.

FRANCIS G. WYNKOOP.

In presence of—
WM. R. HARARD,
J. G. MANLOVE.